United States Patent
Tsukimoto et al.

(10) Patent No.: US 9,199,342 B2
(45) Date of Patent: Dec. 1, 2015

(54) REPAIRING METHOD FOR WALL MEMBER WITH FLOW PASSAGES

(75) Inventors: Koji Tsukimoto, Tokyo (JP); Shingo Nakahara, Tokyo (JP); Mitsuo Hasegawa, Tokyo (JP); Masahiko Mega, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 601 days.

(21) Appl. No.: 13/511,498

(22) PCT Filed: Jan. 13, 2011

(86) PCT No.: PCT/JP2011/050390
§ 371 (c)(1),
(2), (4) Date: May 23, 2012

(87) PCT Pub. No.: WO2011/089957
PCT Pub. Date: Jul. 28, 2011

(65) Prior Publication Data
US 2012/0272611 A1 Nov. 1, 2012

(30) Foreign Application Priority Data
Jan. 20, 2010 (JP) .................. 2010-009990

(51) Int. Cl.
*B23P 6/00* (2006.01)
*B23K 9/04* (2006.01)
(Continued)

(52) U.S. Cl.
CPC ................ *B23P 6/002* (2013.01); *B23K 9/044* (2013.01); *B23K 10/027* (2013.01);
(Continued)

(58) Field of Classification Search
CPC . B23P 6/002; B23P 2700/13; B23K 35/3033; B23K 35/0244; B23K 26/3213; B23K 26/3293; B23K 26/345; B23K 26/1411; B23K 9/044; B23K 10/027; B23K 15/0086; B23K 2201/001; B23K 2203/08; F01D 25/285; F05D 2230/232; F05D 2230/80; F23R 2900/00019
USPC ................ 29/889.1, 402.01, 402.03, 402.06, 29/402.07
See application file for complete search history.

(56) References Cited

U.S. PATENT DOCUMENTS

| 5,933,699 A | 8/1999 | Ritter et al. |
| 6,085,963 A | 7/2000 | Abela |

(Continued)

FOREIGN PATENT DOCUMENTS

| EP | 1 632 720 A1 | 3/2006 |
| JP | 61-92721 A | 5/1986 |

(Continued)

OTHER PUBLICATIONS

Office Action dated Mar. 24, 2014, issued in Chinese Patent Application No. 201180004718.2 with English Translation (10 pages).
(Continued)

*Primary Examiner* — Moshe Wilensky
(74) *Attorney, Agent, or Firm* — Westerman, Hattori, Daniels & Adrian, LLP

(57) ABSTRACT

It is an object to provide a repairing method for a wall member with flow passages capable of reducing the time and the cost required for a partial repairing work on the wall member with flow passages. The repairing method for the wall member with flow passages includes a removal stage of removing a portion of the wall member with flow passages (1) provided with plural flow passages (4) between the base member (2) and the plate member (3), the base member welding stage of welding the repairing base member (6) to the portion removed in the removal stage, a flow passage forming stage of providing plural overlay welds on the repairing base member (6) and forming the flow passages (4) between the overlay welded beads (8), and a plate member welding stage of welding a repairing plate member (9) onto surfaces of the plural overlay welded beads (8).

7 Claims, 4 Drawing Sheets

(51) Int. Cl.
| | |
|---|---|
| *B23K 10/02* | (2006.01) |
| *B23K 15/00* | (2006.01) |
| *B23K 26/14* | (2014.01) |
| *F01D 25/28* | (2006.01) |
| *B23K 26/32* | (2014.01) |
| *B23K 26/34* | (2014.01) |
| *B23K 35/30* | (2006.01) |
| *B23K 35/02* | (2006.01) |

(52) U.S. Cl.
CPC ........ *B23K 15/0086* (2013.01); *B23K 26/1411* (2013.01); *B23K 26/3213* (2013.01); *B23K 26/3293* (2013.01); *B23K 26/345* (2013.01); *B23K 35/0244* (2013.01); *B23K 35/3033* (2013.01); *F01D 25/285* (2013.01); *B23K 2201/001* (2013.01); *B23K 2203/08* (2013.01); *B23P 2700/13* (2013.01); *F05D 2230/232* (2013.01); *F05D 2230/80* (2013.01); *F23R 2900/00019* (2013.01)

(56) References Cited

U.S. PATENT DOCUMENTS

| | | |
|---|---|---|
| 6,427,327 B1 | 8/2002 | Bunker |
| 2002/0062544 A1 | 5/2002 | Bunker |
| 2006/0059918 A1 | 3/2006 | Caldwell et al. |

FOREIGN PATENT DOCUMENTS

| | | |
|---|---|---|
| JP | 2002-201962 A | 7/2002 |
| JP | 2002-361523 A | 12/2002 |
| JP | 2006-208227 A | 8/2006 |
| JP | 3915423 B | 5/2007 |
| JP | 2007-160326 A | 6/2007 |
| JP | 4110632 A | 7/2008 |
| JP | 2010-261318 A | 11/2010 |

OTHER PUBLICATIONS

Extended European Search Report dated May 21, 2013, issued in corresponding European Patent Application No. 11 73 4564.5.
Decision to Grant a Patent dated Jun. 10, 2014, issued in Japanese Patent Application No. 2010-009990 with partial English Tanslation (4 pages).
International Search Report of PCT/JP2011/050390, date of mailing Apr. 26, 2011, with English translation (3 pages).
Written Opinion of The International Searching Authority dated Apr. 26, 2011, issued in International Application No. PCT/JP2011/050390, with Partial Translation (12 pages).
Decision to Grant a Patent dated Jul. 1, 2013, issued in corresponding Korean Patent Application No. 10-2012-7013052 (2 pages).
Chinese Decision to Grant a Patent dated Nov. 6, 2014, issued in corresponding CN Application No. 201180004718.2 with English translation (4 pages).
Communication under Rule 71(3) dated Oct. 14, 2014, issued by European Patent Office in corresponding European Patent Application No. 11 734 564.5. (7 pages).
Decision to Grant a European Patent Pursuant to Article 97(1) EPC dated Feb. 19, 2015, issued in corresponding European Patent Application No. 11734564.5 (2pages) "The Decision to Grant a Patent has been received".

REPAIRING METHOD FOR WALL MEMBER WITH FLOW PASSAGES

TECHNICAL FIELD

The present invention relates to a method for partially repairing a wall member with flow passages for use in a combustor of a gas turbine, for example.

BACKGROUND ART

In a conventional repairing method for repairing a damaged portion of a combustor of a gas turbine, a whole member or a part on which a damage is generated is replaced (For example, Patent Literature 1).

Patent Literature 2 discloses a repairing method for a case in which a crack occurs on a plate having flow passages (referred to as "cooling channels", hereinafter) inside a combustor or the like.

CITATION LIST

Patent Literature

{PTL 1}
The Publication of Japanese Patent No. 3915423
{PTL 2}
Japanese Unexamined Patent Application, Publication No. 2002-361523

SUMMARY OF INVENTION

Technical Problem

However, in a repairing method for the case in which a damage is generated on a tail pipe of a combustor having cooling channels, a damaged portion thereof is removed and part of a base member forming a gas path of the tail pipe is girth welded to the removed portion, and flow passages serving as the cooling channels are formed on the base member by use of a grinder. Thereafter, a repair is made by inserting copper wires into the formed flow passages and welding top portions of the copper wires, and then pulling the copper wires out of the flow passages so as to form the cooling channels. In the case of repairing a tail pipe of a combustor having narrow intervals between cooling channels for the sake of enhancing the cooling effect, the cooling channels cannot be formed by a grinder, so that each panel included in the tail pipe is required to be replaced, which causes a problem of increase in time and cost for the repairing work.

The invention described in Patent Literature 2 has a problem of increase in time and cost for the repairing work if a crack occurs in a wide range.

The present invention has been made in the light of the above circumstances, and has an object to provide a repairing method capable of reducing time and cost required for a partial repairing work on a wall member with flow passages.

Solution to Problem

In order to solve the above problems, the repairing method for a wall member with flow passages of the present invention employs the following solutions.

A repairing method for a wall member with flow passages according to one aspect of the present invention includes a removal stage of removing a portion of the wall member provided with a plurality of flow passages between a base member and a plate member; a base member welding stage of welding a repairing base member to the portion removed in the removal stage; a flow passage forming stage of providing a plurality of overlay welds on the repairing base member and forming flow passages between the overlay welds, and a plate member welding stage of welding a repairing plate member onto surfaces of the plurality of the overlay welds.

Conventionally, if a part of a wall member with a plurality of flow passages between a base member and a plate member is removed, a repairing base member is girth welded with the part removed, and flow passages are formed on the repairing base member by use of a grinder. However, if the flow passages to be formed on the repairing base member have narrow intervals therebetween, it is difficult to form such flow passages by use of a grinder.

In the one aspect of the present invention, plural overlay welds are provided onto the repairing base member, and the repairing plate member is welded onto the surfaces of the overlay welds. Therefore, it is possible to repair even the wall member with flow passages having narrow intervals therebetween. Accordingly, the repairing cost for the wall member with flow passages can be reduced.

In the repairing method for a wall member with flow passages according to the one aspect of the present invention, overlay welding includes laser welding or electron beam welding using powdered welding material.

Overlay welding is performed by laser welding or electron beam welding using powdered welding material. Therefore, it is possible to perform welding to provide a narrow and thin weld width. Accordingly, it is possible to create the flow passages having narrow intervals on the repairing base member.

In the repairing method for a wall member with flow passages according to the one aspect of the present invention, in the flow passage forming stage, a plurality of pipes are provided on the repairing base member before the plural overlay welds are provided on the repairing base member, and the overlay welding is applied between the plurality of the pipes.

The plurality of the pipes are provided on the repairing base member and the overlay welding is applied between these pipes. Therefore, the height of the overlay welds can be set at the same height as that of the pipes, and the width of the overlay welds can be set at the same width as the interval between the pipes. Accordingly, it is possible to reduce the time required for the overlay welding.

In the repairing method for a wall member with flow passages according to the one aspect of the present invention, overlay welding is further applied onto surfaces of the plurality of the overlay welds or a surface opposite to a surface of the repairing plate member that is welded to the plurality of the overlay welds.

Overlay welding is further applied onto surfaces of the overlay welds or a surface opposite to a surface of the repairing plate member that is welded to the surfaces of the overlay welds. Therefore, the overlay welds or the overlay welded repairing plate member can be configured to have a desired thickness and shape. Accordingly, the overlay welds or the overlay welded repairing plate member can have the same shape as that of the existing wall member with flow passages.

In the repairing method for a wall member with flow passages according to the one aspect of the present invention, a plurality of slits are provided in the repairing plate member.

The slits are provided in the repairing plate member. Therefore, when the repairing plate member is welded onto the surfaces of the overlay welds, welding positions can be confirmed visually. Accordingly, it is possible to prevent the welding from failing.

In the above described method, the welding may be performed by welding using an electron beam instead of using a laser. In this case, the combustor is disposed in a vacuum chamber, where the repairing work is carried out.

Advantageous Effects of Invention

The plurality of the overlay welds are provided on the repairing base member, and the repairing plate member is welded onto the surfaces of the overlay welds. Therefore, it is possible to repair the wall member with flow passages with narrow intervals therebetween. Accordingly, the repairing cost for the wall member with flow passages can be reduced.

DESCRIPTION OF EMBODIMENTS

First Embodiment

Figure 1:
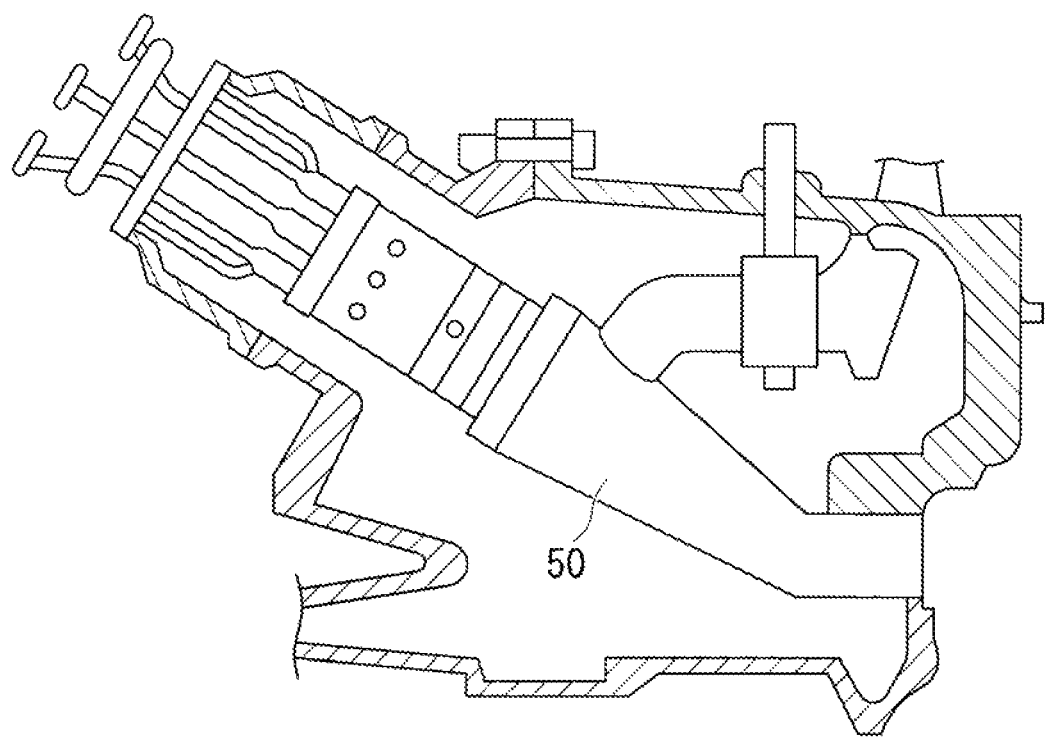
FIG. 1 is a longitudinal section view of a conventional combustor of a gas turbine.

FIG. 1 illustrates a tail pipe 50 of a combustor of a gas turbine. In the present embodiment and the following various embodiments, descriptions will be provided on a repairing method for a wall member with flow passages of the tail pipe 50 of the combustor (not illustrated), but the present invention is not limited to this, and is applicable to a repairing for a wall member with plural flow passages (not illustrated) between a base member (not illustrated) and a plate member (not illustrated).

The wall member with flow passages forming the tail pipe 50 includes the base member (not illustrated) forming the gas path of the combustor and the plate member (not illustrated) on which a plurality of flow passages that are cooling channels are formed.

Figure 2:
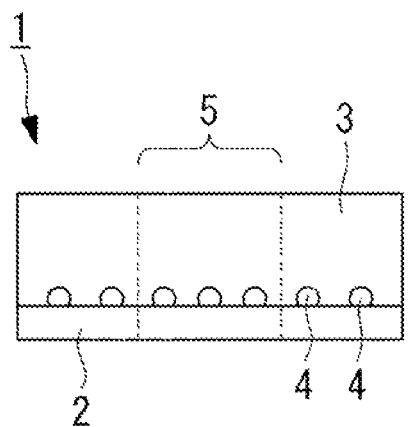
FIG. 2 is a partial cross sectional view of a wall member with flow passages forming a tail pipe of the combustor illustrated in FIG. 1.

FIG. 2 is a partial sectional view of the wall member with flow passages that form the tail pipe.

The wall member with flow passages 1 forming the tail pipe 50 (see FIG. 1) of the combustor of the gas turbine (not illustrated) includes the base member 2 and the plate member 3 on which the plurality of the flow passages 4 are formed. The base member 2 and the plate member 3 are bonded together by brazing. This bonding by brazing creates a plurality of flow passages 4 between the base member 2 and the plate member 3.

In the repairing method for the wall member with flow passages 1 according to the present embodiment, a repair is carried out on a portion 5 of the wall member with flow passages 1 including a damaged portion (not illustrated) generated on the plate member 3 of the wall member with flow passages 1 (referred to as a "removal portion", hereinafter). The repairing method for the wall member with flow passages 1 includes a removal stage, a base member welding stage, a flow passage forming stage and a plate member welding stage.

Figure 3A:
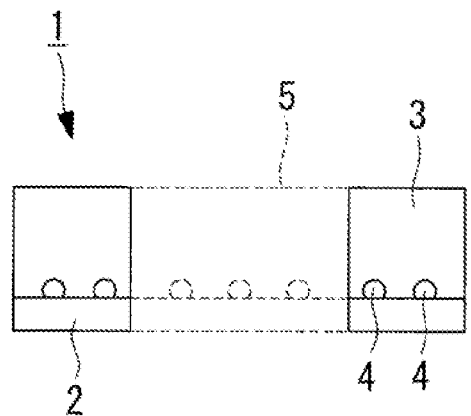
FIG. 3A is a drawing of explaining a repairing method for a wall member with flow passages according to the first embodiment of the present invention.

As illustrated in FIG. 3A, in the removal stage, the removal portion 5 including the damaged portion is removed from the wall member with flow passages 1 forming the tail pipe 50 of the combustor (see FIG. 1). The range of the removal portion 5 is appropriately determined depending on the position and the state of the damaged portion in the wall member with flow passages 1.

Figure 3B:
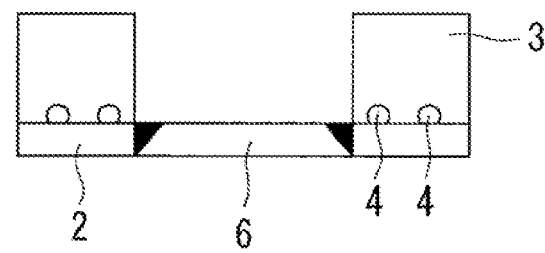
FIG. 3B is a drawing of explaining the repairing method for the wall member with flow passages according to the first embodiment of the present invention.

As illustrated in FIG. 3B, in the base member welding stage, a repairing base member 6 that is machined into a size of the removal portion 5 (see FIG. 3A) is girth welded to the existing base member 2.

A nickel-based superalloy with a thickness of 1.6 mm is used for the repairing base member 6. The product "Tomilloy" of Mitsubishi Materials Corporation, the product "Inconel 617" of Special Metals Corporation, and the product "hastelloy X" of Haynes International or the like are preferable for use as the repairing base member 6 and filler metal, for example.

Figure 3C:
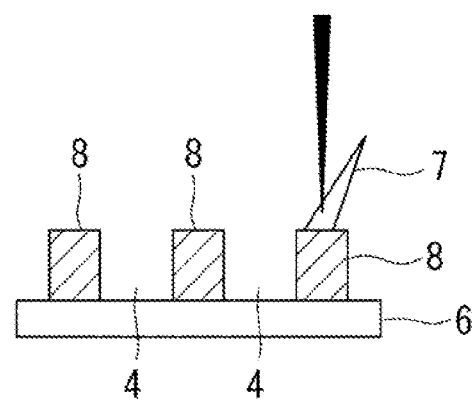
FIG. 3C is a drawing of explaining the repairing method for the wall member with flow passages according to the first embodiment of the present invention.

As illustrated in FIG. 3C, in the flow passage forming stage, a plurality of overlay welds using powdered welding material 7 are applied on the repairing base member 6 that is girth welded on the existing base member 2 (see FIG. 3B). FIG. 3C is a partial enlarged view of the repairing base member 6. The flow passages 4 are formed between a plurality of overlay welded beads 8 formed by providing the plurality of the overlay welds onto the repairing base member 6.

The overlay welding is performed by YAG laser welding (laser welding), for example. The beads 8 formed by the overlay welding are weaving beads (referred to as "beads", hereinafter). The beads 8 may be linear beads. Each of the beads 8 is formed to have a thickness of 3 mm and a weaving width of 2.5 mm, for example. The bead 8 is formed into a predetermined shape by the welding, and may be provided with a weld reinforcement having a height of approximately +1 mm taking account of a post treatment after the welding.

The output of the YAG laser welding used for the overlay welding is preferably 350 W to 700 W. This is because a welding defect occurs if the laser output is 350 W or less, and thermal deformation or a welding crack occurs on the repairing base member 6 if the laser output is 700 W or more due to an excessive heat input.

The welding speed is preferably 100 mm/min to 500 mm/min. This is because deformation or a welding crack occurs on the repairing base member 6 at the welding speed of 100 mm/min due to an excessive heat input, and welding residue occurs at the speed of 500 mm/min or more due to too rapid welding speed.

A nickel-based superalloy that is the same as the repairing base member 6 or the product "Inconel 625" of Special Metals Corporation is preferably used for the powdered welding material 7. The powdered welding material to be used preferably has a particle diameter of 125 μm to 500 μm. The powder is supplied at the powder supply rate of 3 g/min to 15 g/min. It takes longer time to form the beads 8 at the powder supply rate of 3 g/min or less, and a welding defect occurs at the powder supply rate of 15 g/min or more due to excessive powder supply rate.

Figure 3D:
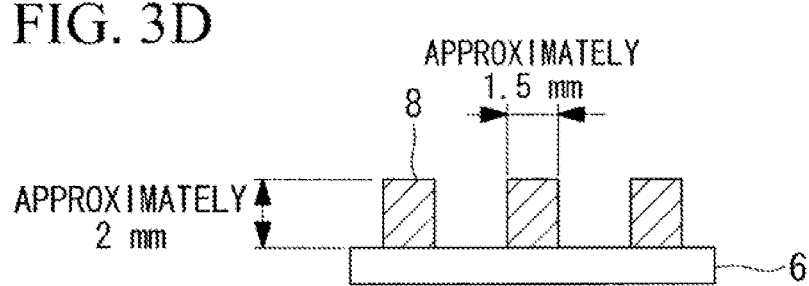
FIG. 3D is a drawing of explaining the repairing method for the wall member with flow passages according to the first embodiment of the present invention.

As illustrated in FIG. 3D, if the weld reinforcement is provided for each bead 8, the bead 8 is fabricated into a predetermined shape with a thickness of 2 mm and a width of 1.5 mm.

Figure 3E:
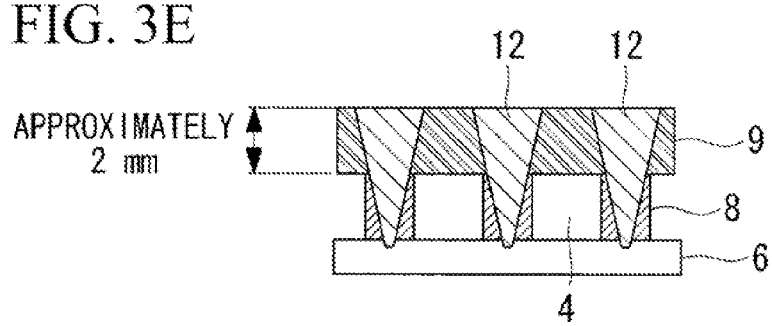
FIG. 3E is a drawing of explaining the repairing method for the wall member with flow passages according to the first embodiment of the present invention.

As illustrated in FIG. 3E, in the plate member welding stage, the repairing plate member 9 with a thickness of 2 mm, for example, is welded onto the surface of each of the plurality of the beads 8, for example. Piercing welding 12 is applied to the repairing plate member 9 and each of the beads 8 by using the YAG laser welding. The laser is so irradiated as to pierce the center of each bead 8.

As described above, according to the repairing method for the wall member with flow passages of the present embodiment, the following operation and effects can be attained.

The overlay welds are provided onto the repairing base member 6 so as to form the plurality of the beads 8 thereon, and the repairing plate member 9 is welded by the YAG laser welding (laser welding) onto the surfaces of the overlay welded beads 8. Accordingly, it is possible to accomplish the repairing for the wall member with flow passages 1 having the flow passages 4 whose intervals are narrow. As a result, the repairing cost for the wall member with flow passages 1 can be reduced.

The overlay welded beads 8 are formed by the YAG laser welding using powdered welding material 7. Therefore, it is possible to form the beads 8 each of which has a narrow and thin width. Accordingly, it is possible to create the flow passages 4 having narrow intervals therebetween on the repairing base member 6.

In the present embodiment, it has been described that each of the beads 8 formed by using the powdered welding material 7 has the weld reinforcement with the height of 2 mm and the width of 1.5 mm, but the present invention is not limited to this, and the bead 8 may have any height and width that can form the flow passages 4 of the wall member with flow passages 1 forming the tail pipe 50.

Welding using an electron beam can be used instead of the YAG laser welding.

The repairing base member 6 may have any thickness as far as it is appropriate for the wall member with flow passages 1 forming the tail pipe 50.

Second Embodiment

Hereinafter, descriptions will be provided on the second embodiment of the present invention. The repairing method for the wall member with flow passages of the present embodiment is different from the first embodiment, where the repairing base member is provided with pipes before applying the overlay welding onto the repairing base member in the flow passage forming stage and the others are the same. Thus, same numbers refer to same components and same repairing methods for the wall member with flow passages, and descriptions thereof will be omitted.

Figure 4A:
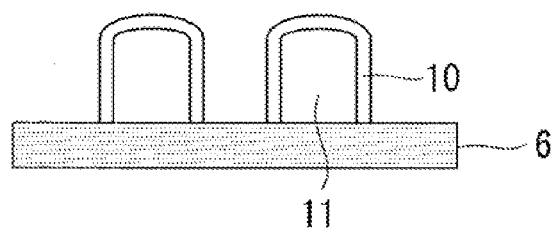
FIG. 4A is a drawing of explaining a repairing method for a wall member with flow passages according to the second embodiment of the present invention.
Figure 4B:
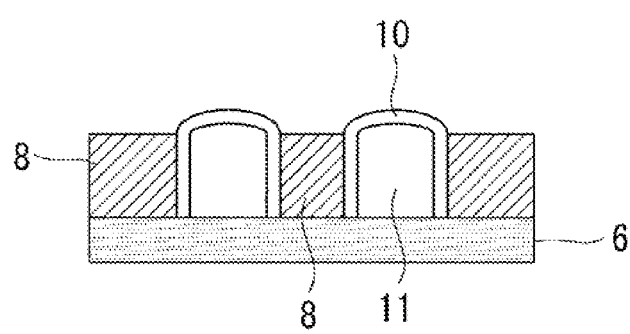
FIG. 4B is a drawing of explaining the repairing method for the wall member with flow passages according to the second embodiment of the present invention.
Figure 4C:
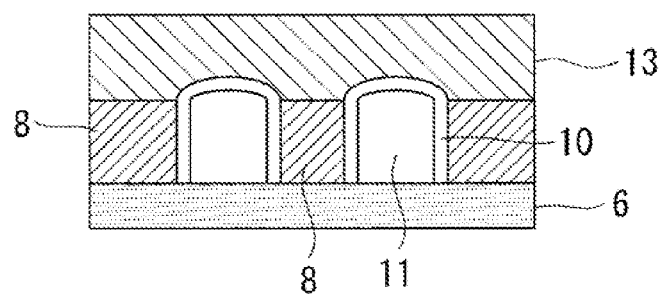
FIG. 4C is a drawing of explaining the repairing method for the wall member with flow passages according to the second embodiment of the present invention.

FIG. 4A to FIG. 4C are drawings of explaining the repairing method for the wall member with flow passages according to the second embodiment of the present invention.

As illustrated in FIG. 4A, in the flow passage forming stage, a plurality of cooling pipes (pipes) 10 are disposed on the repairing base member 6 at equal intervals. Each of the cooling pipes 10 serves for forming a flow passage 11 in the same shape as that of the flow passage 4 formed in the wall member with flow passages 1 (see FIG. 2) forming the tail pipe 50 (see FIG. 1), and may have a height of 2 mm and a width of 1.5 mm, for example.

As illustrated in FIG. 4B, the overlay welding is applied between the plurality of the cooling pipes 10 disposed on the repairing base member 6 at the equal intervals. The overlay welding is carried out by the YAG laser welding using powdered welding material. The beads 8 of the overlay welding are so formed at the approximately same height as that of the cooling pipes 10 as to fill the space between the cooling pipes 10.

As illustrated in FIG. 4C, in the plate member welding stage, overlay welding 13 (referred to as "air-side-surface overlay welding", hereinafter) is further applied onto the cooling pipes 10 and the surfaces of the overlay welded beads 8. The air-side-surface overlay welding 13 is so applied as to reach the same level of the surface of the existing wall member with flow passages 1 (see FIG. 2).

As described above, the repairing method for the wall member with flow passages according to the present embodiment attains the following operation and effects.

The plurality of the cooling pipes (pipes) 10 are provided on the repairing base member 6 and the overlay welding is applied between these cooling pipes 10. Therefore, the height of the overlay welded beads 8 can be set at the same height as that of the cooling pipes 10, and the width of the overlay welded beads 8 can be set at the same width as the interval between the adjacent cooling pipes 10. Accordingly, it is possible to reduce the time required for the overlay welding.

The air-side-surface overlay welding (overlay welding) 13 is further applied onto the surfaces of the overlay welded beads 8. Therefore, the air-side-surface overlay welding 13 can be configured to have a desired thickness and shape. Accordingly, the air-side-surface overlay welding 13 can have the same shape as that of the existing wall member with flow passages 1 (see FIG. 2).

Third Embodiment

Hereinafter, the third embodiment of the present invention will be described. The repairing method for the wall member with flow passages of the present embodiment is different from the first embodiment, where the overlay welding is applied to the opposite surface of the plate member in the plate member welding stage, and the others are the same. Thus, same numbers refer to same components and same repairing methods for the wall member with flow passages, and descriptions thereof will be omitted.

Figure 5A:
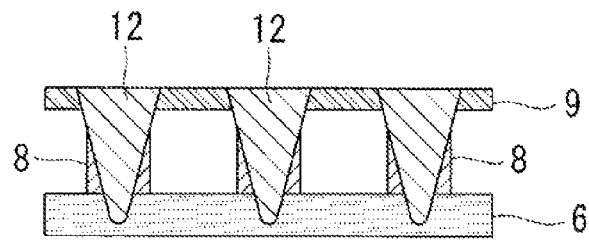
FIG. 5A is a drawing of explaining a repairing method for a wall member with flow passages according to the third embodiment of the present invention.
Figure 5B:
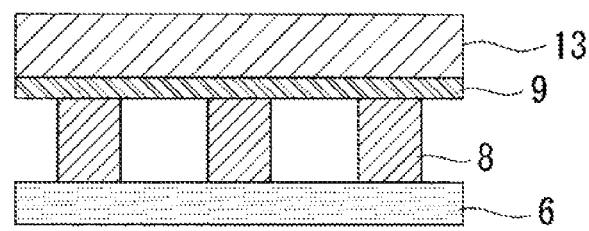
FIG. 5B is a drawing of explaining the repairing method for the wall member with flow passages according to the third embodiment of the present invention.

FIG. 5A and FIG. 5B are drawings of explaining the repairing method for the wall member with flow passages according to the third embodiment of the present invention.

As illustrated in FIG. 5A, in the plate member welding stage, the repairing plate member 9 with a thickness of 1 mm, for example, is welded onto the surfaces of the plural formed beads 8. The piercing welding 12 by using the YAG laser welding is applied to the repairing plate member 9 and the each bead 8. The laser is so irradiated as to pierce the center of each bead 8.

As illustrated in FIG. 5B, the air-side-surface overlay welding (overlay welding) 13 is applied onto the other surface opposite to the surface of the repairing plate member 9, which is in contact with the surfaces of the beads 8. The air-side-surface overlay welding 13 is performed by the YAG laser welding using powdered welding material. The air-side-surface overlay welding 13 is smoothly and evenly applied so as not to generate a difference in level from the plate member 3 of the existing wall member with flow passages 1 (see FIG. 2).

As described above, the repairing method for the wall member with flow passages according to the present embodiment attains the following operation and effects.

The air-side-surface overlay welding (overlay welding) 13 is further applied onto the other surface opposite to the surface of the repairing plate member 9, which is welded to the surfaces of each of the overlay welded beads 8. Therefore, the repairing plate member 9 to which the air-side-surface overlay welding 13 is applied can be configured to have a desired thickness and shape. Accordingly, the air-side-surface overlay welding 13 can have the same shape as that of the existing wall member with flow passages 1 (see FIG. 2).

Fourth Embodiment

Hereinafter, the fourth embodiment of the present invention will be described. The repairing method for the wall member with flow passages of the present embodiment is different from the first embodiment, where the welding is applied to the plate member provided with a plurality of slits, and the others are the same. Thus, same numbers refer to same components and same repairing methods for the wall member with flow passages, and descriptions thereof will be omitted.

Figure 6A:
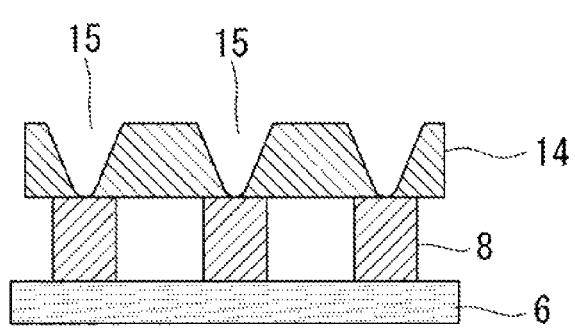
FIG. 6A is a drawing of explaining a repairing method for a wall member with flow passages according to the fourth embodiment of the present invention.
Figure 6B:
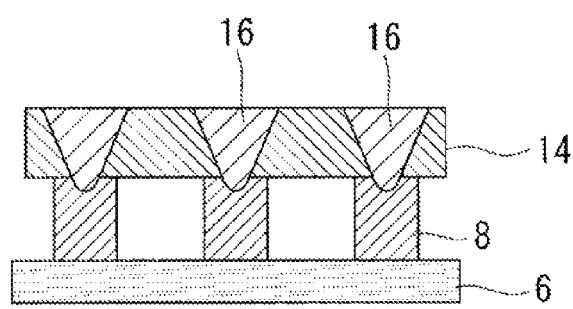
FIG. 6B is a drawing of explaining the repairing method for the wall member with flow passages according to the fourth embodiment of the present invention.

FIG. 6A and FIG. 6B are drawings of explaining the repairing method for the wall member with flow passages according to the fourth embodiment of the present invention.

As illustrated in FIG. 6A, in the plate member welding stage, a plurality of slits 15 are provided in the repairing plate member 14 with a thickness of 2 mm, for example. Each of the slits 15 provided in the repairing plate member 14 has a V-shaped cross sectional shape. The plurality of the slits 15 are so formed as to have the same intervals as those of the surfaces of the beads 8 on which the repairing plate member 14 is welded.

As illustrated in FIG. 6B, in the plate member welding stage, the repairing plate member 14 having the plurality of the slits 15 is welded onto the surface of the beads 8. Slit welding 16 is applied to the repairing plate member 14 by using the laser welding. The laser is so irradiated with adding the filler metal as to pierce the center of each slit 15 formed in the repairing plate member 14 and the center of each bead 8.

As described above, the repairing method for the wall member with flow passages according to the present embodiment attains the following operation and effects.

The slits 15 are provided in the repairing plate member 14. Therefore, when the slit welding (welding) 16 is so applied to the repairing plate member 14 as to be welded onto the surfaces of the overlay welded beads 8, welding positions can be confirmed visually. Accordingly, it is possible to prevent the welding from failing.

In the description of the present embodiment, the repairing plate member 14 and each bead 8 are welded by the slit welding 16 using the laser, but the present invention is not limited to this, and the slit welding 16 may be performed by TIG welding, plasma welding, or electron beam welding.

REFERENCE SIGNS LIST

1 Wall member with flow passages
2 Base member
3 Plate member
4 Flow passage
6 Repairing base member
8 Bead
9 Repairing plate member

The invention claimed is:

1. A repairing method for a wall member with flow passages comprising:
   a removal stage of removing a portion of the wall member provided with a plurality of flow passages between a base member and a plate member;
   a base member welding stage of girth welding a repairing base member to an existing base member which is the base member except for the portion removed in the removal stage;
   a flow passage forming stage of providing a plurality of overlay welds on the repairing base member to form a plurality of beads, and forming flow passages between the adjacent beads; and
   a plate member welding stage of welding a repairing plate member onto surfaces of the plurality of the overlay welds.

2. The repairing method for a wall member with flow passages according to claim 1, wherein
   the overlay welding includes laser welding or electron beam welding using powdered welding material.

3. The repairing method for a wall member with flow passages according to claim 1, wherein
   in the flow passage forming stage, a plurality of pipes are provided on the repairing base member before the plurality of the overlay welds are provided on the repairing base member, the overlay welding is applied between the plurality of the pipes, and the plurality of beads are formed.

4. The repairing method for a wall member with flow passages according to claim 1, wherein
   overlay welding is further applied onto a surface opposite to a surface of the repairing plate member that is welded to the plurality of the beads.

5. The repairing method for a wall member with flow passages according to claim 1, wherein
   a plurality of slits are provided in the repairing plate member.

6. A repairing method for a wall member with flow passages comprising:
   a removal stage of removing a portion of the wall member provided with a plurality of flow passages between a base member and a plate member;
   a base member welding stage of girth welding a repairing base member to an existing base member which is the base member except for the portion removed in the removal stage;
   a flow passage forming stage of providing a plurality of pipes on the repairing base member, applying overlay welding between the plurality of the pipes to form a plurality of beads, and forming flow passages between the adjacent beads; and
   an overlay welding stage of applying further overlay welding onto surfaces of the plurality of the beads.

7. The repairing method for a wall member with flow passages according to claim 6, wherein
the overlay welding includes laser welding or electron beam welding using powdered welding material.

* * * * *